H. N. PACKARD.
HEATING UNIT FOR METERS.
APPLICATION FILED JULY 17, 1914.
1,174,025.
Patented Feb. 29, 1916.
2 SHEETS—SHEET 1.
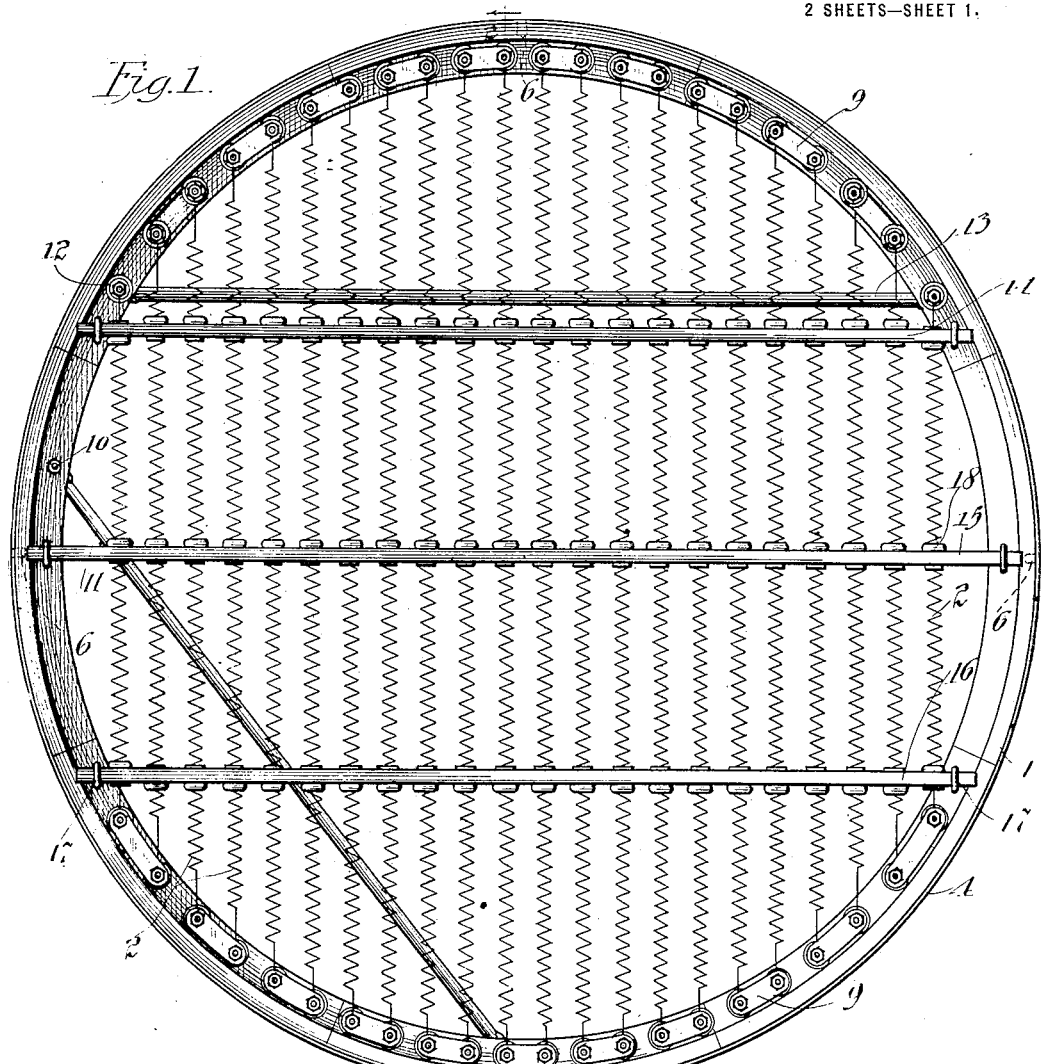
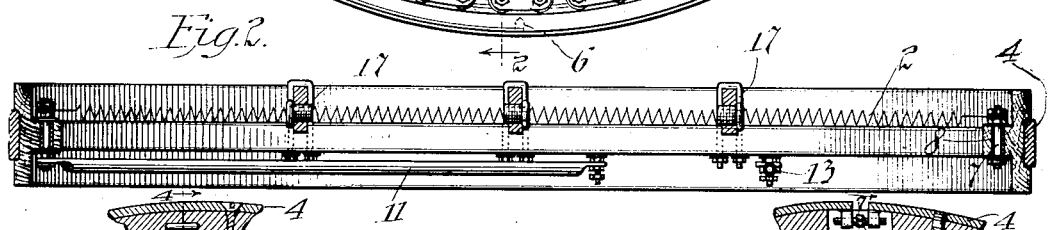
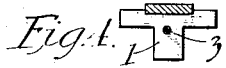
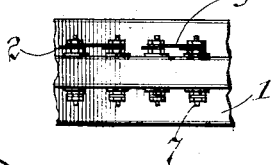
Witnesses:
Inventor:
Horace N. Packard
by Edwin B. H. Tower Jr. Atty H. N. PACKARD.
HEATING UNIT FOR METERS.
APPLICATION FILED JULY 17, 1914.
1,174,025.
Patented Feb. 29, 1916.
2 SHEETS—SHEET 2.
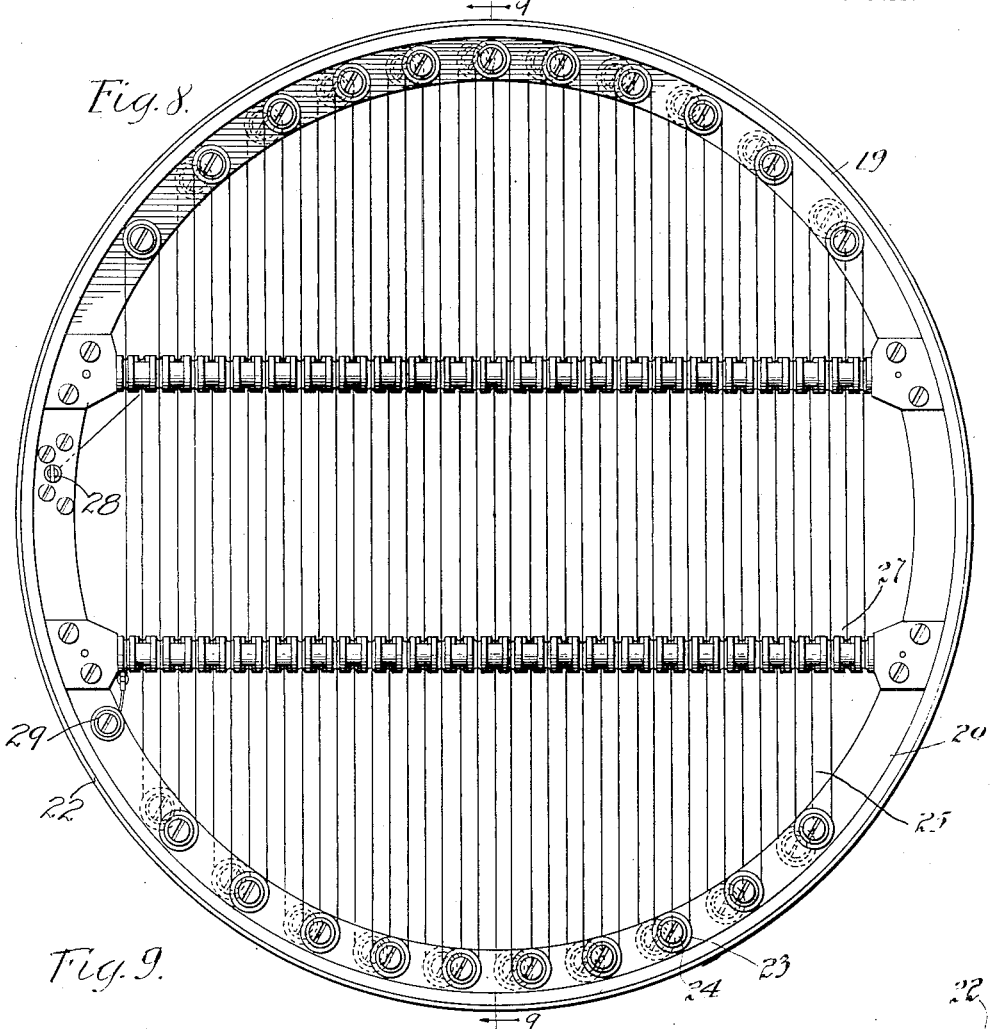
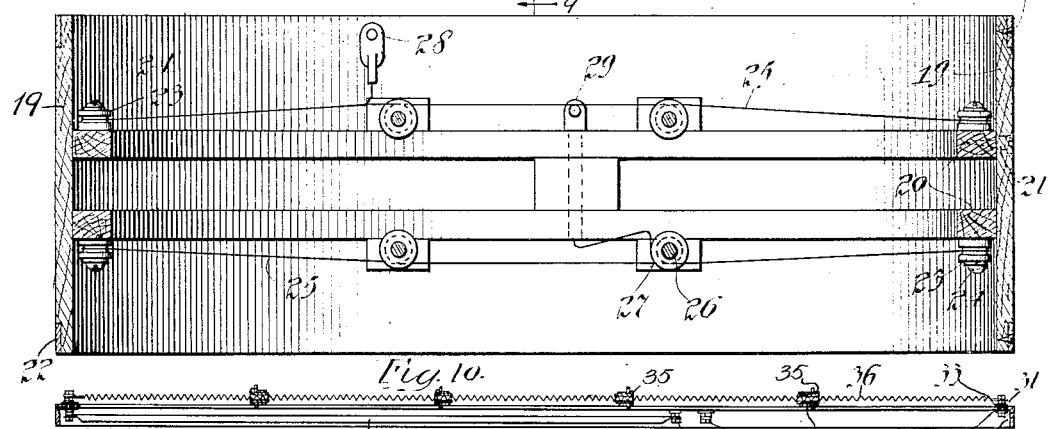
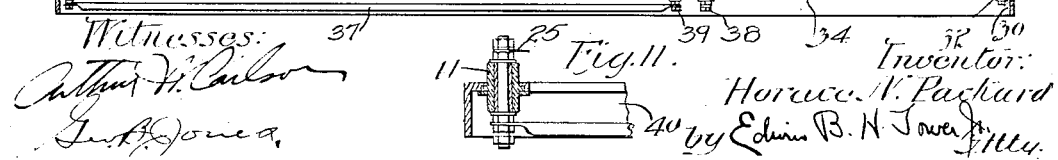

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

HEATING UNIT FOR METERS.

1,174,025. Specification of Letters Patent. Patented Feb. 29, 1916.

Application filed July 17, 1914. Serial No. 851,574.

*To all whom it may concern:*

Be it known that I, HORACE N. PACKARD, a citizen of the United States, residing at Milwaukee, in the county of Milwaukee and State of Wisconsin, have invented new and useful Improvements in Heater Units for Meters, of which the following is a full, clear, concise, and exact description, reference being had to the accompanying drawing, forming a part of this specification.

My invention relates to improvements in heater units for fluid meters.

A meter has been developed heretofore in which the flow of air, gas or other fluid may be accurately determined by dissipating heat from an electrical heater arranged in the conduit through which the fluid is flowing. An electrical resistance thermometer is mounted both before and behind said heater by the use of which the rise in temperature of the fluid may be determined. From said rise in temperature the quantity of fluid flowing may be calculated, regardless of the variations in the temperature and pressure thereof. The apparatus may also be used by automatically varying the amount of current flowing through the heater to maintain a constant predetermined temperature rise between the two resistance thermometers. Under these circumstances, the amount of fluid flowing past the heater is proportional to the varying current furnished thereto. The results may be indicated on a special watt meter or be determined by reference to suitable calibration curves.

The present invention is directed toward improvements in the heater unit used in such meters. These meters are often used to measure the flow of gas from a gas plant, to measure blast furnace gases, coke oven gases and other fluids containing a considerable quantity of tar, naphthalene and other foreign matter in suspension as well as moisture. As a result, difficulty has been experienced in maintaining the necessary insulation between the resistance wire and the frame on which it is supported, due to the deposit of dirt and moisture thereon, and due also to the corrosive action of said impurities which tends to destroy the insulating material itself.

One of the objects of the present invention is to provide an improved heater unit wherein the necessary degree of insulation is maintained despite such unfavorable conditions. Other objects and advantages of the invention will hereinafter appear.

In the accompanying drawings I have illustrated several embodiments of the invention.

Figure 1 is a front elevation of one form of heating unit. Fig. 2 is a central sectional elevation thereof on the line 2—2 of Fig. 1. Fig. 3 is a fragmentary section of the rim of the supporting frame, showing how the rim sections are joined. Fig. 4 is a section on the line 4—4 of Fig. 3. Fig. 5 is a view of a portion of the rim seen from within. Fig. 6 is a side elevation of a detail. Fig. 7 is a section on the line 7—7 of Fig. 6. Fig. 8 is a front elevation of another form of heating unit adapted for use where the deposits of tar, dirt and moisture are very excessive. Fig. 9 is a central sectional elevation thereof on the line 9—9 of Fig. 8. Fig. 10 is a central sectional elevation of a further form of heating unit adapted for use where the deposits of solid matter or moisture are less than with either of the first two forms. Fig. 11 is a fragmentary sectional elevation of an additional form of heating unit.

The heating unit shown in Figs. 1 and 2 comprises in general a wooden hoop or ring 1, across which helically wound resistance wires 2 are disposed, substantially parallel to each other. The hoop is intended to be mounted within a barrel or conduit through which flows the fluid to be measured. The resistance wire is disposed substantially uniformly over the cross section of the conduit so as to heat the entire body of passing fluid as uniformly as possible at any given instant. The wooden hoop being an insulator, the resistance wire is insulated from the conduit which is of metal. The use of an insulating supporting element is very advantageous in any case for the reason that deposits of foreign matter thereon do not result in leakage of current between points of different potential as quickly as when a metal ring is used and the resistance wire insulated therefrom at each point of support. In addition, it is particularly advantageous where the meter is used in connection with a coke plant, as the pipe lines are ordinarily grounded to one generator pole in such cases.

The wooden rim is made in a plurality of sections fitted together with dowel pins 3 (Figs. 3 and 4) glued together and encircled by a metal band 4, the ends of which are drawn together by a suitable reversely screw threaded rod 5 (see Figs. 6 and 7). Said band may be held in place by suitable screws and it has a plurality of openings 6 therein, whereby it may be conveniently secured in place within the conduit.

The hoop is preferably of T cross section. The resistance wires are secured at their opposite ends to small bolts 7 which pass through the inwardly projecting flange of the rim as shown in Fig. 2. Said bolts pass through metal bushings 8 inserted in openings in said flange. The adjacent bolts are connected by short conducting links 9 preferably made of brass, whereby the individual spans of resistance wire may be connected in series with each other, the current flowing back and forth across the grid thus formed. The resistance wire considered as a continuous conductor may be so arranged as to cause the current to follow either a series or a parallel path. In Fig. 1 a parallel or multiple arrangement is illustrated, although a series connection may be readily effected. The current flows from one terminal 10 through a suitable conductor 11 having the form of a flattened tube to a point on the rim, from which point said current flows in two paths back to the other terminal 12. One path leads directly back and forth through the resistance wire, whereas the other path includes a second flattened tube 13.

To suitably support the helical coils of resistance wire 2, I provide preferably a plurality of wooden cross bars 14, 15. 16, arranged substantially parallel. These cross bars are secured to the wooden rim by U-shaped bolts 17 or suitable equivalent fastenings. Each cross bar has a series of openings therein, in which insulators 18 are mounted through which the resistance wires pass. Long spans are thereby obviated and at the same time the wooden rim is suitably reinforced.

Where a series arrangement is desired, only a single conducting tube similar to the tube 11 or 13 is necessary, as the resistance wire conducts the current from the positive terminal back and forth across the hoop to a point on the opposite side thereof from which it returns directly through said tube to the negative terminal adjacent to the positive terminal. The tube or tubes, as the case may be, serve the further purpose of reinforcing the wooden hoop.

In Figs. 8 and 9, the unit is adapted for use where the deposits of tar are particularly bad, the design being such as to prevent creepage of current or jumping between points at different potentials. The wooden rim 19 is much wider than in the first form of heater unit and is provided with two wooden hoops 20 secured by screws 21 to form a pair of annular flanges within said hoop. Metal hoops 22 are secured to the outer surface of the rim 19 and serve as means by which the unit may be secured to the conduit in which it is mounted. A plurality of insulators 23 are secured at suitable intervals around the hoops 20 by means of screws 24. A resistance wire 25 is looped back and forth across each hoop forming two grids, each in a different plane, the arrangement of the individual spans being staggered or offset whereby said spans as a whole are disposed substantially uniformly across the entire area of said hoop. Wooden cross bars 26 are provided on which are mounted a plurality of grooved insulators 27, the latter serving to position the individual spans. The ends of the conductors are connected to suitable terminals 28, 29. In this form of heater, the resistance wire is arranged in two planes although, of course, an arrangement in a greater number of planes may be employed. The advantage of this distribution in two planes is that the potential difference between any two points tending to cause leakage of the current is about half what it would otherwise be. If the number of planes is still further increased, these differences of potential may be still further reduced. The insulating surfaces between any point in the heater circuit and the outer metallic barrel in which the heater is mounted are considerably greater than in the first form of heater described. This is an advantage, of course, where tar and deposits accumulate and tend to form a path for the current between the heater wire and the meter barrel. Another advantage of this construction is that the circuit of the heating current is a metallic heating circuit of the same material throughout. This is important because in the presence of some deposits, electrolytic corrosion occurs where two different metals are in contact in the circuit. Furthermore, the resistance material in this form of heater is of straight wire. The helical coils shown in Fig. 1 might fill up with tar, dirt and other deposits inside the coil if used in measuring a gas in which such foreign matter occurs in excessive quantities, although said coils may be used satisfactorily under the proper conditions. The straight wire arrangement is particularly adapted for use in such objectionable gases as just referred to.

Although wood has been referred to as a material which may be employed in the construction of the hoops and reinforcing bars, it is to be understood, of course, that other insulating materials may be employed instead. Where wood is used, it is impregnated preferably with tar oil to further improve its insulating properties.

In Fig. 10, I have shown a sectional elevation of a heating unit in which the hoop consists preferably of a casting 30 of angle section on which are mounted a plurality of conducting pins or bolts 31, the latter being insulated from said angle iron by mica bushings 32 and washers 33. The cross bars 34 are also of metal and support insulating bushings 35 through which pass the coils of resistance wire 36. A conducting tube 37 constituting a return conductor, serves a purpose similar to that described in connection with the first form of device illustrated whereby the terminals 38, 39 may be arranged adjacent to each other on said hoop in a convenient position, but insulated therefrom by further mica bushings and washers.

In Fig. 11, I have illustrated a further modification in which a metal hoop 40 is employed around which are mounted a plurality of glass insulators 41 to which the resistance wire is secured as shown. This mounting also insures against electrolytic action.

In all of the forms of heating unit described, it will be seen that the resistance wire is thoroughly insulated from the barrel or conduit, whether the supporting frame be of wood or metal. Where the deposits of tar, naphthalene or other foreign matter or moisture are excessive, the insulating frame construction is much to be preferred, as a considerable coating can be allowed to collect thereon without resulting in any substantial loss in efficiency, the various points of different potential being separated sufficiently to preclude the possibility of any considerable leakage of current from one to the other. The metal frame construction is suitable for use where the conditions of service are less severe in this regard.

It is obvious that various changes may be made in the details of the construction described and illustrated without departing from the spirit of the invention.

Having thus described my invention what I claim as new and desire to secure by Letters Patent of the United States is:

1. An electric heating unit for meters comprising an annular supporting frame of insulating material having means on the inner side thereof for supporting a resistance wire so that it is distributed uniformly over the area inclosed by the frame, said frame being provided on its outer surface with a metal hoop for supporting said frame in a conduit.

2. An electric heating unit for meters comprising an annular supporting frame of insulating material provided with a flange on the inner surface thereof having means thereon for supporting a resistance wire so that said wire is uniformly distributed over the area inclosed by the frame, said frame being provided on its outer surface with a metal hoop for supporting said frame in a conduit.

3. A heating unit comprising a circular supporting rim, a plurality of cross bars secured to said rim and having openings therein, an insulator in each of said openings and a plurality of helical resistance wires secured at the opposite ends to said rim each passing through an insulator.

4. A heating unit comprising a circular hoop of insulating material, a plurality of helical resistance coils mounted on said hoop, a terminal on said hoop adjacent to one end of the wire constituting the resistance coils, a second terminal adjacent to said first terminal and a conductor connecting said second terminal to the other end of said resistance wire, said conductor serving also to reinforce said hoop mechanically.

5. A heating unit comprising a wooden rim of T section having a circumferential recess and a metal band located in said recess by means of which said hoop may be secured within a conduit, and a plurality of spans of resistance wire uniformly disposed across the area inclosed by said hoop.

6. A heating unit comprising a sectional rim, a supporting and reinforcing band therefor, a plurality of resistance wires supported on said rim in substantially parallel relation and uniformly disposed across the area inclosed by said rim and conducting links connecting adjacent alternate ends of said resistance wires to connect them in series.

7. A heating unit comprising a wooden rim having an annular flange, a plurality of bolts passing through said flange and resistance wires secured to said bolts whereby said wires are arranged in a plane between the end planes of said rim.

8. A heating unit for meters comprising a supporting frame of insulating material and a continuous metallic resistor mounted thereon by being strung back and forth in a plurality of substantially parallel planes, the spans in one plane being offset with respect to the remaining spans to distribute said resistor substantially uniformly across the area of said supporting frame whereby the individual spans are separated a maximum distance, and whereby electrolytic action between the resistor and its support is eliminated.

In witness whereof, I have hereunto subscribed my name in the presence of two witnesses.

HORACE N. PACKARD.

Witnesses:
R. H. VAN NEST,
W. E. SARGENT.